United States Patent Office 3,294,749
Patented Dec. 27, 1966

3,294,749
LATENT CATALYSTS FOR CURING
EPOXY RESINS
Richard J. Pratt, Menomonee Falls, Wis., assignor to Allis-Chalmers Manufacturing Company, Milwaukee, Wis.
No Drawing. Filed May 21, 1963, Ser. No. 282,124
10 Claims. (Cl. 260—47)

This invention relates to the curing of polyepoxides. More particularly, this invention relates to a novel process for resinifying polyepoxide admixed with polycarboxylic acid anhydride using certain substituted urea derivatives as curing agents and to the useful products resulting therefrom.

Polyepoxides, also known as epoxy resins, are a broad class of organic compounds containing the vicinal epoxy or oxirane structure:

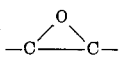

Polyepoxides are in widespread commercial use as adhesives, castings, surface coatings, electrical insulation and the like. The polyepoxides are not thermosetting when pure, but reaction in the presence of a so-called curing agent or accelerator will convert them into a resinified, cross linked, polymeric, thermoset plastic.

The amine type curing agents, such as diethylene triamine and dimethylamine, are extremely fast acting when used in conjunction with polyepoxide. Once such curing agents have been introduced into the polyepoxide, the batch must be used immediately, or the resin will harden in production equipment and upon tools. Thus, to obviate waste, the admixture of resin and amine type curing agents cannot exceed the quantity which is capable of being utilized rapidly. Production must, therefore, be carefully scheduled so that a catalyzed batch will be completely consumed before setting. At some sacrifice in product quality, some artisans have extended the pot life of a catalyzed resin a short time, usually only hours, by adding a diluent or heating it to reduce its viscosity. Another objection to the amine curing agents is that generally they have an odor ranging from unpleasant to noxious. They also are reputed to cause irritation to the skin and mucous membranes.

While certain slower acting curing agents such as acid anhydrides are available, they are not entirely satisfactory because they require extended heating at elevated temperature to achieve a satisfactory cure. Even at elevated temperatures, anhydrides are sluggish and are unsuited for use in compositions requiring rapid cure. Products obtained through anhydride cure are often deficient in durability and hardness because of an incomplete and insufficient cross linkage of polyepoxide.

Much effort has lately been expended to produce a polyepoxide system that remains mobile and workable and yet will quickly cure to a hard resinified product when desired. With such a system it would be possible to prepare a quantity of polyepoxide at a convenient time and place. When production requirements warranted, a portion of this preparation could be withdrawn and rapidly transformed to a hard product. Such a system would require a latent curing agent that remained unreactive toward the polyepoxide until heating initiated reaction. The difficulty with many known latent curing agents is that they are a poor compromise between latency and reactivity. These systems although having extended pot life often suffer from slow reactivity once curing is initiated. Therefore, long in-mold time is encountered and production slowed. Other so-called latent systems, while able to undergo rapid gelation, only succeed in extending useful pot life a few days. They become thickened and viscous and are impossible to handle easily. Mild heating may reduce viscosity, but the trouble required to restore workability is nearly as great as the effort required to prepare a wholly fresh system.

Accordingly, one of the objects of my invention is to provide a heat curable polyepoxide system which possesses extended pot life.

A further object of my invention is to provide a latent epoxy resin composition.

A still further object is to provide a process for curing polyepoxide resins into hard infusible products with a speed commensurate to known nonlatent curing agents.

Another important object is to provide a curing agent for polyepoxides which is free from offensive odor.

A still further object is to provide a curing agent which greatly accelerates the curing of a polycarboxylic acid anhydride polyepoxide system.

These and additional objects, as shall hereinafter appear, are fulfilled by the present invention in a remarkable and unexpected fashion as will be readily discerned from a consideration of the following detailed description and claims.

In order to facilitate the understanding of my invention, the order of presentation I shall follow is: Polyepoxides; Polycarboxylic Acid Anhydrides; Urea Type Accelerators; Mechanisms; Processes and Products.

POLYEPOXIDES

Polyepoxides, as the term is used herein, defines those organic compounds having a plurality of

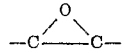

epoxy groups per molecule. The polyepoxides suitable for use with my invention include those having terminal 1,2 epoxy groups and those having epoxy groups located within the internal structure of the molecule.

In most commercially manufactured polyepoxide resins there often are present molecules of varying molecular weight. Sometimes copolymerization causes this variance. Copolymerization results in a net loss of epoxy groups available per unit weight of the commercial product as compared to a noncopolymerized product comprising uniform molecular structure. In other polyepoxides the raw material itself consisted of materials of varying molecular weight prior to epoxidation. For example, soybean oil comprises the mixed gylcerol esters of oleic, linoleic, and linolenic acids. These acids have 1, 2 and 3 unsaturated carbon to carbon bonds respectively. Epoxidation of soybean oil will lead to a product having a varying number of epoxy groups present in each molecule. Therefore, the convention has been followed of expressing the number of epoxy groups present in a given polyepoxide in terms of epoxy equivalency.

The epoxy equivalency is the number of epoxy groups per polyepoxide molecule based on an average or effective molecular weight. The epoxy equivalency may be determined analytically by reacting a known weight of polyepoxide of known effective molecular weight with an excess of hydrochloric acid of known normality. Any unreacted acid is then back titrated and the number of equivalents of acid reacting with the resin is determined.

Epoxy equivalency=

$$\frac{(\text{grams resin sample})(\text{equivalents acid})}{(\text{effective molecular weight resin})}$$

The epoxy equivalency rarely is an integer. Those resins suitable for use with my invention must have an epoxy equivalency greater than 1.0.

The term equivalents of polyepoxide resin shall be encountered later, is defined as follows:

Equivalents polyepoxide=
$$\frac{\text{(grams polyepoxide)}}{\text{(effective molecular weight)(epoxy equivalency)}}$$

The most widely used class of polyepoxide resins are the glycidyl polyethers of polyhydric alcohols and the glycidyl polyethers of polyhydric phenols. These polyepoxides are exemplified by the condensation product of epichlorohydrin $$\overset{O}{\underset{}{\diagup\!\!\diagdown}}$$
$$CH_2CH\!-\!CH_2\!-\!Cl$$

with 2,2,-bis(4 hydroxyphenyl)propane $$HO\!-\!\langle\!\!\bigcirc\!\!\rangle\!-\!\underset{\underset{CH_3}{|}}{\overset{\overset{CH_3}{|}}{C}}\!-\!\langle\!\!\bigcirc\!\!\rangle\!-\!OH$$

to give $$\overset{O}{\underset{}{\diagup\!\!\diagdown}}\;\;\;\;\;\;\;\;\;\;\;\;\;\;\;\;\;\overset{CH_3}{|}\;\;\;\;\;\;\;\;\;\;\;\;\;\;\;\;\;\overset{O}{\underset{}{\diagup\!\!\diagdown}}$$
$$CH_2\!-\!CH\!-\!CH_2\!-\!O\!-\!\langle\!\!\bigcirc\!\!\rangle\!-\!\underset{\underset{CH_3}{|}}{C}\!-\!\langle\!\!\bigcirc\!\!\rangle\!-\!O\!-\!CH_2\!-\!CH\!-\!CH_2$$

together with copolymers.

Copolymerization results in compounds such as $$CH_2\!\!-\!\!\overset{O}{\overset{\diagup\!\!\diagdown}{CH}}\!\!-\!\!CH_2\!\!-\!\!O\!\!-\!\!\langle\!\!\bigcirc\!\!\rangle\!\!-\!\!\underset{\underset{CH_3}{|}}{\overset{\overset{CH_3}{|}}{C}}\!\!-\!\!\langle\!\!\bigcirc\!\!\rangle\!\!-\!\!O\!-\!\!\left[\!CH_2\!\!-\!\!\overset{OH}{\overset{|}{CH}}\!\!-\!\!CH_2\!\!-\!\!O\!\!-\!\!\langle\!\!\bigcirc\!\!\rangle\!\!-\!\!\underset{\underset{CH_3}{|}}{\overset{\overset{CH_3}{|}}{C}}\!\!-\!\!\langle\!\!\bigcirc\!\!\rangle\!\!-\!\!O\!\right]_n\!\!-\!\!CH_2\!\!-\!\!\overset{O}{\overset{\diagup\!\!\diagdown}{CH}}\!\!-\!\!CH_2$$

where $n$ is an integer of 1 or greater.

Another broad group of polyepoxides suitable for use with my invention are those produced from the epoxidation of an unsaturated carbon to carbon bond. One known method used to carry out this is to react an organic peroxide, such as m-chlorobenzoic peracid $$O\!=\!C\!-\!OOH$$
$$\underset{}{|}$$
$$\langle\!\!\bigcirc\!\!\rangle\!-\!Cl$$

with R—CH=CH—R to yield $$R\!-\!CH\!\!-\!\!-\!\!CH\!-\!R$$
$$\underset{O}{\diagdown\!\!\diagup}$$

where R represents alkyl groups, aryl groups, substituted alkyl and aryl groups and the like.

This reaction can be used to epoxydize such compounds as unsaturated oils, polydienes and the like. For example, the peracidic oxidation of $$\langle\!\!\bigcirc\!\!\rangle\!-\!\underset{\underset{CH_2}{|}}{C}\!-\!\overset{\overset{O}{\|}}{C}\!-\!O\!-\!\underset{\underset{CH_3}{|}}{}\!\langle\!\!\bigcirc\!\!\rangle$$

yields 3,4-epoxy-6-cyclohexyl-methyl-3,4-epoxy-6-cyclohexylmethylcarboxylate, known commercially as "Epoxy 201," a trademark of Union Carbide, New York, New York.

Other complex polymers have been synthesized. One of these is "Oxiron 2000," a trademark of Food Machinery and Chemical Corporation, New York, New York, are also suitable for use with my invention. "Oxiron 2000" is an epoxy resin of the type having the structural formula $$-\!\!\left[\!CH_2\!-\!\overset{\overset{}{|}}{CH}\!-\!\overset{\overset{}{|}}{CH}\!-\!CH_2\!-\!CH_2\!-\!\overset{\overset{}{|}}{CH}\!\!-\!\!\overset{O}{\overset{\diagup\!\!\diagdown}{CH}}\!\!-\!\!CH_2\!-\!CH_2\!-\!CH\!=\!CH\!-\!CH_2\!-\!CH_2\!-\!\overset{\overset{}{|}}{CH}\!-\!CH_2\!-\!\overset{\overset{}{|}}{CH}\!-\!\right]_x$$
(with OH, O, C=O, CH₃ and HO, O, CH₂, H₂C substituents)

where X represents the number of monomer units in the polymer chain. The uncured resin has a viscosity of 1800 poise at 25° C., a specific gravity of 1.010 and an epoxy equivalent of 177. "Paraplex G-62" is a trademark of Rohm and Haas Company, Philadelphia, Pennsylvania, for its epoxidized soybean oil.

A still further group of polyepoxides which is suitable for use with my invention is the novalac resins. These are polymeric resins obtained from the condensation with an aldehyde with a polyhydric phenol. "Dowden 438–181," a trademark of Dow Chemical Company, Midland, Michigan, is considered typical of this type of polyepoxide and is so used throughout this specification.

The point of reactivity for cross linking reactions for any polyepoxide is the 3 membered oxirane ring, or as it is often called, the vicinal epoxy ring. Since all polyepoxides have this functional group in common, regardless of other functional differences that may occur, I believe, as will appear later, that my invention is operative with any polyepoxide that has a plurality of vicinal epoxy groups.

POLYCARBOXYLIC ACID ANHYDRIDES

The carboxylic acid anhydride used in the process of my invention may be any of those acid anhydrides which possess at least one anhydride group $$-\!C\!=\!O$$
$$\;\;\;\;\;\;\diagdown$$
$$\;\;\;\;\;\;\;\;\;\;O$$
$$\;\;\;\;\;\;\diagup$$
$$-\!C\!=\!O$$

The polycarboxylic acids are easily dehydrated to the anhydrides. Those which will dehydrate to form stable five or six membered rings are easily produced. The anhydride group is that portion of the molecule which actively partakes in the curing of polyepoxides. The structure of the remainder of the molecule may either be a combination of aliphatic, or cyclic, either saturated or unsaturated, aromatic or heterocyclic substituted or unsubstituted functions. The choice is left to the skilled artisan to make on the basis of the known qualities various of these anhydrides impart to cured polyepoxides. Some examples of polycarboxylic acid anhydrides which I have found particularly suitable are dodecenyl succinic anhydride; phthalic anhydride; and methyl Nadic anhydride, a registered trademark of Allied Chemical and Dye Corporation, New York, New York. Also suitable, although rather too reactive to be attractive are maleic anhydride; hexahydro phthalic anhydride; and pyromellitic dianhydride and glutaric anhydride.

The term equivalents percent of anhydride, as used throughout this specification, is defined as follows:

Equivalents percent anhydride=
$$\frac{\text{grams anhydride}\times 100}{\text{(molecular weight anhydride)/(number of carboxylate groups) (eq. pep.)}}$$

where eq. pep. is understood to mean equivalents polyepoxide. The equivalents percent is based on a percent by weight basis of polyepoxide. Thus, a 75 equivalents percent of polycarboxylic acid anhydride is 3 weight-equivalents of anhydride present for every 4 weight-equivalents of polyepoxide.

The prior art teaches that 1 equivalent of polycarboxylic acid anhydride is preferably present for every equivalent of polyepoxide. (i.e., 100 equivalents percent of anhydride.) I have found that in the practice of my invention it is preferable to also have 100 equivalents percent of polycarboxylic acid anhydride, although a wide tolerance is permissible. There can be as little as 50 and as much as 150 equivalents percent of anhydride without deleterious effect.

UREA TYPE ACCELERATORS

Urea, $O=C(NH_2)_2$, may be considered the diamide of the hypothetical carbonic acid, $O=C(OH)_2$. Thiourea may, likewise, be thought of as the diamide of the hypothetical monothiocarbonic acid, $S=C(OH)_2$. The N-substituted derivatives of urea and thiourea are known and have the general formula

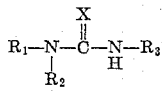

where X represents a member of the group comprising oxygen and sulfur and where $R_1$, $R_2$ and $R_3$ are selected from the groups comprising hydrogen, alkyl groups; aryl groups; and groups in which $R_1$ and $R_2$ comprise a single heterocyclic group including the nitrogen, for example a piperidyl group.

The general method for producing N-substituted urea and thiourea is to react an isocyanate or a thioisocyanate with a primary or secondary amine. It is apparent that tertiary amines having no available hydrogen will not react. As an example of this synthesis, the reaction of ethyl isocyanate with aniline produces as the main product N,ethyl N'phenyl urea.

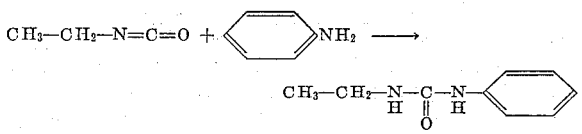

Thus the nitrogen originally associated with the isocyanate gains a hydrogen.

Only N-N alkyl derivatives that have at least one hydrogen present on at least one of the amido nitrogen atoms are suitable for use with my invention.

Other methods for producing specific N-substituted derivatives of urea and thiourea are outlined in R. W. Chalton and A. R. Day, Journal of Organic Chemistry 1–552–8, 1937, and United States Patent 2,247,495.

If a polyamine is reacted with a isocyanate or thioisocyanate a carbamate is formed. For example, piperazine reacted with isopropyl isocyanate yields piperazinyl di-iso-propyl carbamate:

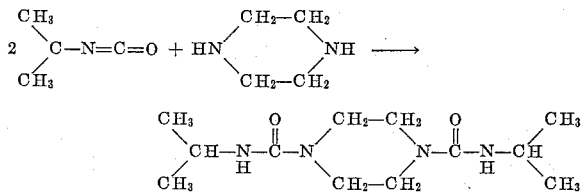

Those carbamates or thiocarbamates derived from primary or secondary polyamines are suitable for use with my invention. The general structure of such compounds is

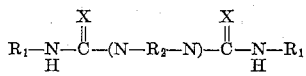

where $R_1$ is selected from the group comprising hydrogen alkyl groups; aryl groups and $(N-R_2-N)$ is a derivative of a primary or secondary polyamine.

All of these compounds, urea, thiourea, the N-substituted ureas, N-substituted thioureas, the N-substituted carbamates and N-substituted thiocarbamates are considered hereinafter for the purposes of brevity as urea accelerators.

The amount of urea type derivative required for use with my invention ranges from 1 to 10 equivalent percent based on equivalents of polyepoxide.

Equivalents percent urea type accelerator=

$$\frac{(100)(\text{moles urea type accelerator})}{\text{equivalents polyepoxide}}$$

Thus 1 equivalent percent of urea type derivative would comprise one equivalent of urea type derivative for every 100 equivalents of polyepoxide.

Some urea type derivatives I found to be particularly useful accelerators are: pentamethylene urea; N-isopropyl-N'-pentamethylene urea; N,N di-n-butyl urea; piperazinyl dicarbamate; n-butyl pentamethylene urea; N, N-dimethyl-N'-tolyl urea; cyclohexyl pentamethylene urea; N,N-di-n-butyl-N'-iso-propyl urea; N,N'-dicyclohexyl urea; piperazinyl di-isopropyl carbamate; ethyl urea; propyl urea; isopropyl urea; ter-butyl urea; methylenebisurea; cyclohexyl urea; ethylene bisurea; N,N'-di-isopropyl urea; benzyl urea; n-heptyl urea; N butyl,-N'ter-butyl urea; N,N'-di-t-butyl urea; N-cyclohexyl, N'-isopropyl urea; N,N'-di-t-butyl thio urea; N-benzyl N'-isopropyl urea; N-benzyl N' cyclohexyl urea; N butyl, N-methyl-N'-phenylurea; N,N'-diphenyl urea; N-cyclohexyl urea; N,N'-di-isopropylurea; N,N-diphenyl thiourea; N, N,-dicyclohexyl-n'-phenyl urea; urea; methyl urea; thiourea; N,N'-diethylthiourea; N,N-dihydroxyethylurea; N,N-dihydroxyethyl-N'-isopropyl urea; N,N-dihydroxyethyl,N' phenyl urea; N,N-dicyclohexyl urea; N,-cyclohexyl-N',N'-di[hydroxyethyl] urea; N,N'-dicyclohexyl thiourea; N,N-dibutyl-N'phenyl urea; N,N dicyclohexyl-N' isopropyl urea.

MECHANISMS

Investigation of the infrared spectra of admixtures of polyepoxides, urea type accelerators and polycarboxylic acid anhydrides when compared to heated mixtures of only polyepoxide/urea type accelerator and only polycarboxylic acids/urea type accelerator failed to reveal any evidence of a mechanism which could be assigned to my process.

I am of the opinion that the probable effect of urea type accelerators is one or a combination of the following: (1) decomposition of the urea type accelerator to amine; (2) direct reaction of urea derivative with the polyepoxide to form amine; or (3) concerted action of anhydride and urea type accelerator upon the polyepoxide. When polycarboxylic acid anhydride was added to a mixture of polyepoxide and urea type accelerator that has been kept for 72 hours at 150° C. without noticeable reaction, the admixture gelled promptly, as reported below in Example IV. The cure, therefore, need not necessarily proceed through the thermal decomposition of urea derivatives. One catalyst, N,N' dicyclohexyl urea proved exceptionally capable of effecting cures 50° C. below its decomposition temperature. While generally the more sterically hindered compounds are most effective, this is not an absolute guide to the selection of an accelerator. The least and the most hindered urea type accelerators required longer heating to achieve gelation than those intermediate urea type accelerators. From these results, I am led to believe that the cure is most probably through the mechanism (2) or a combination of (1) and (2).

PROCESSES AND PRODUCTS

The novel process by which I am able to transform a polyepoxide resin into a fused, resinified product may be succinctly stated as follows. I admix a polyepoxide, a polycarboxylic acid anhydride and a urea type accelerator. This admixture remains mobile and workable for a considerable period of time. Cross linking may be initiated at an intermediate time by heating this admixture to a temperature of from about 100° C. to about 175° C. The best results appear obtainable at a temperature of 150° C. The mixture thereupon irreversibly gels.

Effect of temperature on gel time at 10% urea type accelerator equivalency+100% anhydride equivalency.

TABLE I

|  | 105–110° C. | | 150° C. | |
| --- | --- | --- | --- | --- |
|  | Dodecenyl succinic anhydride | Methyl Nadic anhydride | Dodecenyl succinic anhydride | Methyl Nadic anhydride |
| Cyclohexyl pentamethylene urea | 3 hr | 2 hr | ¼ hr | ¼ hr. |
| N,N'-dicylclohexyl urea | 1¼ hr | 1¼ hr | ¼ hr | ¼ hr. |

Gelation is that condition where reaction has progressed sufficiently so that a molded or poured article will maintain its shape without support. The time required to obtain gelation after application of heat is known as gel time.

After gelation, reaction is not complete. Some but not all the polyepoxide has been cross linked. To insure complete cross linking, it is advisable to subject the gelled article to a post cure. Post curing is common and well known in the art. The time required for an adequate post cure varies from one to sixteen hours. The temperature ranges from 100 to 200° C.

An alternate procedure is to admix the polyepoxide and the polycarboxylic acid anhydride to form a premixture. This mixture is then heated to a temperature selected so that no reaction takes place, but at which rapid reaction occurs with little or no additional heating when the urea type accelerator is interjected into the premixture.

Thus, I have discovered a process for curing polyepoxy resins which has a surprisingly extended period of latency, yet which will promptly react to form a hard resinified product.

Reference to Table II will indicate the remarkable improvement in gel time obtained by the addition of urea type accelerators to the polyepoxide/anhydride mixture. Those results marked with an asterisk reacted with sufficient violence accompanied by frothing to entrap bubbles within the cured product.

TABLE II

| At 150° C. | Control | 1 PU | EU | U |
| --- | --- | --- | --- | --- |
| Epon 828: PA, hours | 3 | 1 | 1 | 1 |
| Epon 828: NMA, hours | No cure | 6 | 6 | 6 |
| Epon 828: GA, hours | 3½ | 1 | 1 | 2 |
| Paraplex G62: PA | No cure | *1½ | *1 | *1 |
| Paraplex G62: NMA | No cure | 22¼ | 22¼ | 22¼ |
| Paraplex G62: GA | 2¾ | 1¼ | 1½ | 2¼ |
| Oxiron 2,000: PA | ½ | *½ | *½ | *½ |
| Oxiron 2,000: NMA | ½ | *½ | 6½ | *½ |
| Oxiron 2,000: GA | ⅙ | *⅙ | *⅙ | *⅙ |
| Dowden 438-181: PA | ¾ | *¼ | *¼ | *¼ |
| Dowden 438-181: NMA | 1½ | *¾ | *¾ | *¾ |
| Dowden 438-181: GA | ½ | *¼ | *¼ | *¼ |
| At 125° C., Oxiron 2,000-NMA | 2½ | *½ | *½ | *½ | where in Table II it is understood that PU is propyl urea; EU is ethyl urea; U is urea; PA is phthalic anhydride; NMA is methyl Nadic anhydride; and GA is glutaric anhydride.

The violence of the reaction is indicative of reactivity resulting from the inclusion or addition of a urea type accelerator to the admixture of polyepoxide and polycarboxylic acid anhydride. The violence may be alleviated by either heating at a lower temperature or otherwise controlling the exothermic heat of reaction.

Another and equally remarkable facet of my discovery is the extended shelf life of a mixture of polyepoxide; urea type accelerator; and acid anhydride. Thus, a single container can be used to hold in readiness everything that is required to produce the final product and awaits only the application of heat.

To insure the prolonged latency of this admixture, it is advisable to store in a closed container protected from moisture. The storage temperature should not exceed 35° C.

TABLE III

|  | DDSA—Epon 828 | | DDSA—Oxiron 2,000 | |
| --- | --- | --- | --- | --- |
|  | 5 days | 8 days | 5 days | 8 days |
| MBU | 0.75 | 1.00 | 0.90 | 1.35 |
| U | 0.85 | 1.10 | 1.00 | 1.15 |
| PeMU | 1.15 | 1.35 | 1.35 | 1.40 |
| DCHUs | 1.55 | 2.00 | 1.20 | 1.30 |
| DBU | 2.15 | 3.80 | 1.35 | 1.45 | where in Table III MBU is methylenebisurea; U is urea; PeMU is pentamethylene urea; DCHUs is dicyclohexyl urea; DBU is dibutyl urea; and DDSA is dodecenyl succinic anhydride.

Tables III and IV show the results pot life studies of various *three component systems* of my invention. The viscosity of these systems is an excellent measure of their latency. The viscosity is recorded as "viscosity number" in Table III rather than absolute viscosity. Viscosity number is a ratio of viscosity of the three component system to the viscosity of the polyepoxide resin and anhydride. Thus, a viscosity number of 1 indicates that the viscosity of the three component system is identical to a control sample of polyepoxide resin and anhydride. The following relationship is then apparent.

Absolute viscosity=(viscosity number)(absolute vis).

All reported absolute viscosities were measured with a Brookfield Viscometer model RVF.

In each example A; B; C and the control, 20 grams of Epon 828 was admixed with 13.7 grams of dodecenyl succinic anhydride. However, A also contained 0.555 gram dicyclohexyl urea; B, 0.185 gram and C, 0.093 gram.

TABLE IV

| Days | A | B | C | Control |
| --- | --- | --- | --- | --- |
| 0 |  |  |  | 1,500 |
| 6 | 11,600 | 5,400 | 4,200 | 2,800 |
| 13 | 51,000 | 8,000 | 5,200 | 3,400 |
| 19 | 268,000 | 13,600 | 8,000 | 4,200 |
| 29 |  | 21,000 | 8,400 | 3,000 |
| 37 |  | 60,000 | 18,400 | 3,600 |
| 42 |  | 68,000 | 18,400 | 3,600 |
| 48 | (¹) | 290,000 | 28,000 | 4,000 |
| 57 |  |  | 57,000 | 5,000 |

¹ Very hard and opaque.

Effect on heating at 150° C.

| A | B | C | Control |
| --- | --- | --- | --- |
| No liquefaction. | Liquified then gelled in <½ hour. | Viscosity initially fell to 3,000 then rapidly rose until gellation occurred in <1 hour. | No gellation after several hours. |

The following examples are intended to be illustrative of my invention. They are intended to further the understanding rather than limit the scope of my invention.

*Example I*

This example is illustrative of the rapid cure obtained with substituted urea derivative, anhydride and a glycidyl polyether (EPON 828; Shell Chemical Company).

"EPON 828" is an epoxy resin of the type having the structural formula

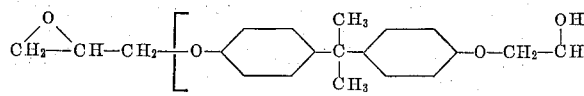

where $n$ represents the number of monomer units in the polymer chain. The uncured resin has a viscosity of 100–160 poises at 25° C. and an epoxide equivalent of 180–195.

To 190 parts by weight of EPON 828 was admixed 89 parts by weight methyl Nadic anhydride and 10.5 parts by weight of cyclohexylpentamethylene urea. This admixture was transferred to a shallow aluminum dish and heated to 150° C. After ¼ hour the mixture had gelled as determined by the fact that no material clung to a probe introduced into the resin mixture.

*Example II*

This example is illustrative of the rapid cure obtained when dodecenyl succinic anhydride is substituted for methyl Nadic anhydride. To 190 parts by weight of EPON 828 was admixed 132 parts of dodecenyl succinic anhydride and 10.5 parts by weight of cyclohexylpentamethylene urea. This admixture when treated as the admixture of Example I also gelled in ¼ hour.

*Example III*

This example is illustrative of certain properties of a resin cured by the process of my invention. To 190 parts weight of EPON 828 was admixed 89 parts by weight of methyl Nadic anhydride and 3.8 parts by weight of piperazinyl diisopropyl carbamate.

Strips approximately ⅛" x 1" x 4" were prepared in an iron and brass partitioned mold and cured for six hours at 150° C. The strips were conditioned at a relative humidity of 50% for at least 4 hours. A tensile of 780 lbs. and 5900 lbs./sq. inch was obtained for the resin product of this example. The thickness was 0.132; elongation 0.10 and integration 876.

*Example IV*

This example is illustrative of the capability of urea derivatives to accelerate the reaction of a polyepoxide and a polycarboxylic acid anhydride. To 4.0 grams of EPON 828 was added 0.4 gram of dicyclohexylurea. The admixture was heated to 150° C. After 72 hours at this temperature no gelation had occurred. One hundred equivalent percent of dodecenyl succinic anhydride was added and the resulting admixture gelled in less than fifteen minutes.

It is to be understood that changes and variations may be made without departing from the spirit and scope of the invention as defined in the appended claims.

Having now particularly described and ascertained the nature of my said invention and the manner in which it is to be performed, I declare that what I claim is:

1. A process for producing a resinified product which comprises mixing and heating a polyepoxide having a

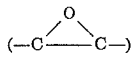

epoxy equivalency greater than 1.0 with a polycarboxylic acid anhydride and a curing accelerator selected from the group having the general structural formula (I)

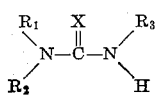

(II)

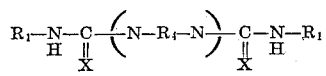

where X is selected from the group consisting of oxygen and sulfur; $R_1$, $R_2$ and $R_3$ are selected from the group consisting of hydrogen, alkyl groups, terminally hydroxy substituted alkyl groups and phenyl groups and $R_4$ is selected from the group consisting of alkylene, piperazinyl and phenylene groups.

2. The process of producing a resinified product which comprises mixing and heating a polyepoxide having

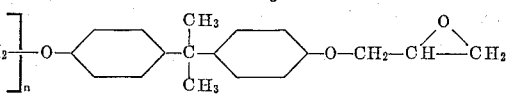

epoxy equivalency greater than 1.0 with a polycarboxylic acid anhydride and an accelerator selected from the group consisting of pentamethylene urea; N-isopropyl-N'-pentamethylene urea; N,N-dibutyl urea; piperazinyl dicarbamate; n-butyl pentamethylene urea; N,N-dimethyl-N'-tolyl thiourea; cyclohexyl pentamethylene urea; N,N-dibutyl-N'-isopropyl urea; N,N'-dicyclohexyl urea; piperazinyl diisopropyl carbamate.

3. The process according to claim 2 in which the polyepoxide is a condensation product of epichlorohydrin and a polyhydric phenol.

4. The process according to claim 2 in which the polyepoxide is a condensation product of epichlorohydrin and a polyhydric alcohol.

5. The process according to claim 2 in which the polyepoxide is 3,4 - epoxy-6-cyclohexyl-methyl-3,4-epoxy-6-cyclohexyl-methyl carboxylate.

6. The process according to claim 2 in which the polycarboxylic acid anhydride is selected from the group consisting of methyl Nadic anhydride and dodecenyl succinic anhydride.

7. The process of producing a resinified product comprising: (1) admixing a polyepoxide having

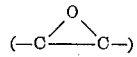

epoxy equivalency greater than 1.0 with an accelerator selected from the group consisting of pentamethylene urea; N-isopropyl-N'-pentamethylene urea; N,N-dibutyl urea; piperazinyl dicarbamate; n-butyl pentamethylene urea; N,N-dimethyl-N'-tolyl thiourea; cyclohexyl pentamethylene urea; N,N-dibutyl-N'-isopropyl urea; N,N'-dicyclohexyl urea; piperazinyl diisopropyl carbamate and heating this admixture to a temperature of from 100 to 150° C;

(2) interjecting a polycarboxylic acid anhydride into said admixture;

(3) subjecting the gelled reaction product of the foregoing steps to a post cure at elevated temperature of from 100 to 175° C.

8. The process of producing a resinified product which comprises mixing and reacting a polyepoxide having

epoxy equivalency greater than 1.0 with from 50 to 150 equivalent percent of a polycarboxylic acid anhydride and from 1 to 10 equivalent percent of an accelerator selected from the group consisting of petamethylene urea; N-isopropyl-N'-pentamethylene urea; N,N-dibutyl urea; piperazinyl dicarbamate; n-butyl pentamethylene urea; N,N-dimethyl-N'-tolyl thiourea; cyclohexyl pentamethylene urea; N,N-dibutyl-N'-isopropyl urea; N,N'-dicyclohexyl urea; piperazinyl diisopropyl carbamate.

9. The process of producing a resinified product comprising:

(1) preparing a latent admixture of a polyepoxide having a

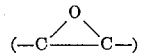

epoxy equivalency greater than 1.0 with a polycarboxylic acid anhydride and an accelerator having the general structural formula (I) 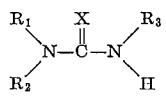

(II) 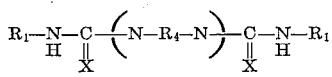

where X is selected from the group consisting of oxygen and sulfur; $R_1$, $R_2$ and $R_3$ are selected from the group consisting of hydrogen, alkyl groups, terminally hydroxy substituted alkyl groups and phenyl groups and $R_4$ is selected from the group consisting of alkylene, piperazinyl and phenylene groups;

(2) heating this admixture to a temperature of from 100° to 175° C. until gelation has occurred.

10. The process of claim 9 wherein the polyepoxide is mixed with 50 to 150 equivalent percent of the polycarboxylic acid anhydride and from 1 to 10 equivalent percent of the accelerator.

References Cited by the Examiner

UNITED STATES PATENTS

| | | | |
|---|---|---|---|
| 2,713,569 | 7/1955 | Greenlee | 260—47 |
| 2,768,153 | 10/1956 | Shokal | 260—47 |
| 2,876,260 | 3/1959 | Huyser et al. | 260—47 |
| 3,052,650 | 9/1962 | Wear et al. | 260—47 |

OTHER REFERENCES

Lee et al.: "Epoxy Resins," page 15 relied on, Mc-Graw-Hill Book Co., New York, 1957 (copy in S.C., TP986. E6L4).

WILLIAM H. SHORT, *Primary Examiner.*

T. D. KERWIN, *Assistant Examiner.*